(12) United States Patent
Critelli (10) Patent No.: US 12,174,973 B2
(45) Date of Patent: Dec. 24, 2024

(54) PROCESSING SYSTEM AND CORRESPONDING METHOD OF OPERATION

(71) Applicant: STMICROELECTRONICS S.r.l., Agrate Brianza (IT)

(72) Inventor: Rosalino Critelli, Misterbianco (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 209 days.

(21) Appl. No.: 17/737,570

(22) Filed: May 5, 2022

(65) Prior Publication Data

US 2022/0374530 A1 Nov. 24, 2022

(30) Foreign Application Priority Data

May 18, 2021 (IT) .................... 102021000012821

(51) Int. Cl.
*G06F 21/60* (2013.01)
*G06F 9/46* (2006.01)
*G06F 13/16* (2006.01)
*G06F 21/85* (2013.01)
*H04L 9/06* (2006.01)

(52) U.S. Cl.
CPC ............ *G06F 21/602* (2013.01); *G06F 9/467* (2013.01); *G06F 13/1673* (2013.01); *G06F 21/85* (2013.01); *H04L 9/0618* (2013.01)

(58) Field of Classification Search
CPC .... G06F 21/602; G06F 9/467; G06F 13/1673; G06F 21/85; H04L 9/0618
See application file for complete search history.

(56) References Cited

U.S. PATENT DOCUMENTS

| | | | |
|---|---|---|---|
| 4,316,055 A | * | 2/1982 | Feistel .................. H04L 9/0637 380/37 |
| 8,762,609 B1 | | 6/2014 | Lam et al. |
| 8,874,926 B1 | | 10/2014 | Edwards et al. |

(Continued)

FOREIGN PATENT DOCUMENTS

| | | |
|---|---|---|
| CN | 1991801 A | 7/2007 |
| CN | 101042682 A | 9/2007 |

(Continued)

OTHER PUBLICATIONS

Tan et al., "Optimization and Benchmark of Cryptographic Algorithms on Network Processors," IEEE Micro, vol. 0272-1732/04, pp. 55-69, 2004.

*Primary Examiner* — Lesa M Kennedy
(74) *Attorney, Agent, or Firm* — Seed IP Law Group LLP (57) ABSTRACT

A master device issues memory burst transaction requests via an interconnection bus to fetch data from a slave device. A cipher engine is coupled to the interconnection bus and decrypts the fetched data to produce plaintext data for the master device. The cipher engine selectively operates according to a stream cipher operation mode, or a block cipher operation mode. The cipher engine is configured to stall a read data channel of the interconnection bus between the slave device and the master device in response to the cipher engine switching from the block cipher operation mode to the stream cipher operation mode. The read data channel is reactivated in response to a last beat of a read burst of the plaintext data produced by the cryptographic engine.

26 Claims, 4 Drawing Sheets

(56) References Cited

U.S. PATENT DOCUMENTS

| | | |
|---|---|---|
| 10,237,066 B1 | 3/2019 | Langhammer et al. |
| 11,042,655 B2 | 6/2021 | Guarnaccia et al. |
| 2002/0010883 A1 | 1/2002 | Coffey et al. |
| 2003/0189936 A1 | 10/2003 | Terrell et al. |
| 2005/0021986 A1 | 1/2005 | Graunke et al. |
| 2005/0276413 A1 | 12/2005 | Neogi |
| 2007/0050642 A1 | 3/2007 | Flynn et al. |
| 2007/0140477 A1 | 6/2007 | Wise |
| 2007/0162610 A1 | 7/2007 | Un et al. |
| 2008/0019524 A1 | 1/2008 | Kim et al. |
| 2008/0034139 A1 | 2/2008 | Han et al. |
| 2009/0327716 A1 | 12/2009 | Raju et al. |
| 2010/0111295 A1* | 5/2010 | Okada .................. H04L 9/0637 380/28 |
| 2012/0144079 A1 | 6/2012 | Sakaguchi et al. |
| 2013/0080790 A1 | 3/2013 | Pean et al. |
| 2016/0021401 A1 | 1/2016 | LaBosco et al. |
| 2016/0021430 A1 | 1/2016 | LaBosco et al. |
| 2016/0171249 A1 | 6/2016 | Circello et al. |
| 2016/0364343 A1 | 12/2016 | Case et al. |
| 2019/0386816 A1 | 12/2019 | Critelli et al. |
| 2020/0313860 A1 | 10/2020 | Junttila et al. |

FOREIGN PATENT DOCUMENTS

| | | |
|---|---|---|
| CN | 107251474 A | 10/2017 |
| CN | 107615701 A | 1/2018 |
| CN | 209980248 U | 1/2020 |

\* cited by examiner

PROCESSING SYSTEM AND CORRESPONDING METHOD OF OPERATION

BACKGROUND

Technical Field

The description relates to on-the-fly decryption of data retrieved from a memory device in a processing system.

One or more embodiments may apply to a cipher engine that performs data decryption on an AXI (Advanced eXtensible Interface) bus.

Description of the Related Art

In a microcontroller unit (MCU) or microprocessor unit (MPU), a master device (e.g., a processing core) may access a slave device (e.g., a memory or an interface to an external memory) to retrieve data therefrom via an interconnect, such as an AXI bus. The AMBA AXI protocol specification is given in document "AMBA® AXI™ and ACE™ Protocol Specification," ARM IHI 0022E (ID033013), published online by ARM®.

The data fetched from the memory device may be encrypted for security reasons. Therefore, a memory cipher engine (MCE) may be coupled to the AXI bus to decrypt the data retrieved from the memory (e.g., the ciphertext) before forwarding the data to the master device as plaintext.

In certain applications, the memory cipher engine may operate according to plural decryption modes, such as a block cipher mode and a stream cipher mode, resulting in different types of data traffic on the AXI bus. The selection of the operation mode may be dynamic, such that the type of data traffic on the AXI bus may change from time to time, with the risk of generating inconsistencies and/or protocol violations.

BRIEF SUMMARY

In an embodiment, a processing system comprises: a master device, which, in operation, issues memory burst transaction requests; a slave device, which, in operation, produces data in response to memory burst transaction requests; a cipher engine, which, in operation, outputs plaintext data; and an interconnection bus coupled to the master device, the slave device and the cipher engine, wherein the cipher engine selectively operates in one of a plurality of operation modes, the plurality of operation modes including: a stream cipher operation mode, wherein a stream of data produced by the slave device is processed in a combination circuit of the cipher engine to produce plaintext data provided to the master device by the cipher engine via the interconnection bus; and a block cipher operation mode, wherein a block of data produced by the slave device is stored in a buffer memory of the cipher engine, and processed in a cryptographic engine of the cipher engine to produce plaintext data provided to the master device by the cipher engine via the interconnection bus, wherein, in response to an indication of a change from the block cipher mode of operation to the stream cipher mode of operation, the cipher engine: stalls a read data channel of the interconnection bus between the slave device and the master device; and responds to an indication the master device has received a last beat of a read burst of plaintext data associated with a block of data stored in the buffer memory by reactivating the read data channel.

In an embodiment, a method comprises: issuing, by a master device, memory burst transaction requests; producing, by a slave device, data in response to memory burst transaction requests; processing, by a cipher engine, data, outputting plaintext data; and coupling together, using an interconnection bus, the master device, the slave device and the cipher engine, wherein the cipher engine selectively operates according one of a plurality of operation modes, the plurality of operation modes including: a stream cipher operation mode, wherein decrypting the data comprises decrypting a stream of data produced by the slave device using a combination circuit of the cipher engine to produce plaintext data provided to the master device by the cipher engine via the interconnection bus; and a block cipher operation mode, wherein decrypting the data comprises storing a block of data produced by the slave device in a buffer memory of the cipher engine, and processing the data stored in the buffer memory in a cryptographic engine to produce plaintext data provided to the master device by the cipher engine via the interconnection bus, wherein, the method includes: stalling a read data channel of the interconnection bus between the slave device and the master device in response to an indication of a change from the stream cipher operation mode to a block cipher operation mode; and reactivating the read data channel in response to an indication the master device has received a last beat of a read burst of plaintext data associated with a block of data stored in the buffer memory.

In an embodiment, a device comprises: an interface; and a cipher engine coupled to the interface, wherein the cipher engine, in operation, outputs plaintext data responsive to memory burst transaction requests via the interface, wherein the cipher engine selectively operates according one of a plurality of operation modes, the plurality of operation modes including: a stream cipher operation mode, wherein the cipher engine, in operation, applies combinational logic to a stream of data to produce plaintext data; and a block cipher operation mode, wherein the cipher engine, in operation, applies block processing operations to a stored block of data to produce plaintext data, wherein, in response to an indication of a change from the block cipher mode of operation to the stream cipher mode of operation, the cipher engine: stalls a read data channel of the interface; and responds to an indication of receipt of a last beat of a read burst of plaintext data associated with a block of data processed in the block cipher mode of operation by reactivating the read data channel.

In an embodiment, a non-transitory computer-readable medium's contents cause a cipher device to perform a method, the method comprising: selectively operating a cipher engine in one of a plurality of operational modes, the plurality of operational modes including: a stream cipher mode of operation, wherein the cipher engine applies combinational logic to a stream of data to produce plaintext data; and a block cipher mode of operation, wherein the cipher engine applies block processing operations to a stored block of data to produce plaintext data; and responding to an indication of a change from the block cipher mode of operation to the stream cipher mode of operation by: stalling a read data channel; and responding to an indication of receipt of a last beat of a read burst of plaintext data associated with a block of data processed in the block cipher mode of operation by reactivating the read data channel.

One or more embodiments may thus facilitate a dynamic switching operation of a memory cipher engine in a processing system between a block cipher operation mode and a stream cipher operation mode while complying with the requirements of the communication protocol of the interconnection bus of the processing system.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

As previously discussed, in a processing system such as a microcontroller unit (MCU) or a microprocessor unit (MPU), a cryptographic engine can be used to cipher (e.g., encrypt and/or decrypt) data provided by a slave device (e.g., an external memory controller) on a communication bus (e.g., an AXI bus) in a dual manner. A first operation mode, referred to as stream ciphering (e.g., a counter (CTR) encryption mode), may be used for high-speed communication and generic data transmission. A second operation mode, referred to as block ciphering (e.g., an electronic codebook (ECB) encryption mode), may be used for secure data transmission. Depending on the selection of the operation mode of the cryptographic engine, data traffic on the bus may therefore be of different kinds.

Figure 1:
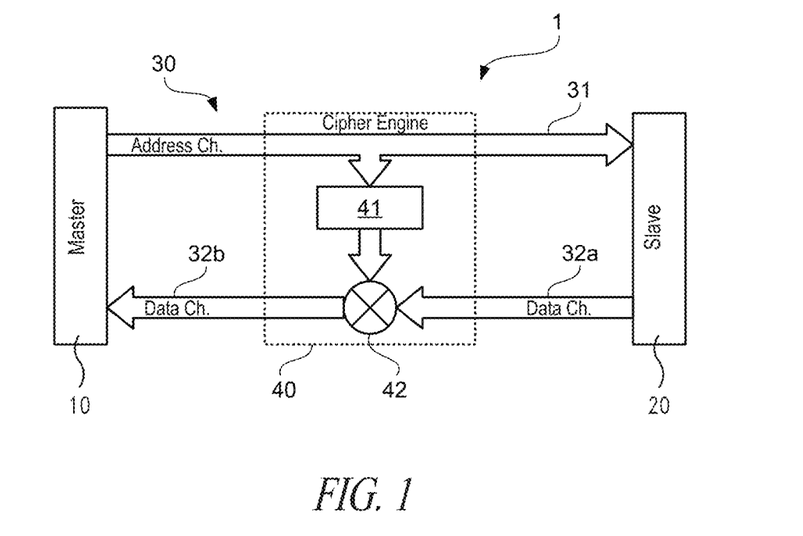
FIG. 1 is a circuit block diagram exemplary of a processing system including an on-the-fly memory cipher engine operating in a stream cipher operation mode.

FIG. 1 is a block diagram exemplary of a processing system including an on-the-fly memory cipher engine (MCE) that operates in a first operation mode. As exemplified in FIG. 1, a processing system 1 (e.g., a MCU or a MPU) may comprise a master device 10 (e.g., a processing core) and a slave device 20 (e.g., a memory or a memory interface) coupled via an interconnection bus 30 (e.g., an AXI bus). The interconnection bus 30 may comprise an address channel 31 and a data channel 32a, 32b. The processing system 1 may comprise a memory cipher engine 40 coupled to the interconnection bus 30 and configured to apply Advanced Encryption Standard (AES) ciphering (e.g., AES encryption and/or decryption) to the data on the bus 30 by means of an AES engine 41.

As exemplified in FIG. 1, the memory cipher engine 40 may operate in a first operation mode, e.g., a stream cipher mode such as a counter (CTR) mode. In this operation mode, the master device 10 issues an AXI request on the address channel 31 that includes the address of the data to be retrieved from the slave device 20. The AXI request is propagated to the slave device 20 and to the AES engine 41 of the cipher engine 40. The AES engine 41 computes a respective keystream as a function of the data address, and applies XOR processing 42 to the encrypted data retrieved from the slave device 20 via the data channel 32a and the keystream computed by the AES engine 41. The corresponding plaintext data is returned to the master device 10 via the data channel 32b. Therefore, the encrypted data is XORed (e.g., in a combinatorial manner) with a precomputed keystream, which is generated as a function of the data address, while the burst request is propagated to the slave device 20 without modifications.

The stream ciphering operation mode exemplified in FIG. 1 relies on a simple and straightforward data transfer on the AXI bus 30, insofar as the address channel 31 and the data channel 32 are parallel. However, such an operation mode may be vulnerable to brute force attacks on the data bus.

Figure 2:
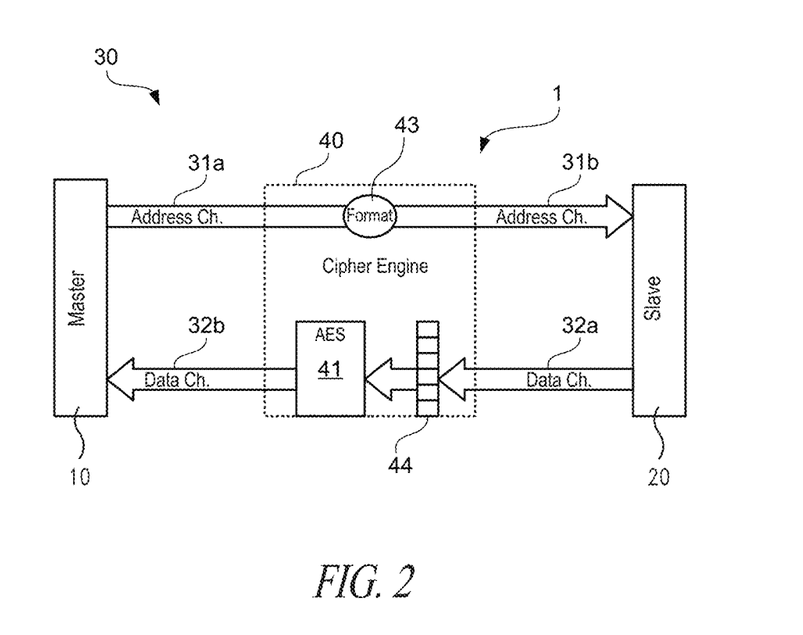
FIG. 2 is a circuit block diagram exemplary of a processing system including an on-the-fly memory cipher engine operating in a block cipher operation mode.

FIG. 2 is a block diagram exemplary of the processing system 1 of FIG. 1 where the on-the-fly memory cipher engine 40 operates in a second operation mode, e.g., a block cipher mode such as an electronic codebook (ECB) mode. In this operation mode, the master device 10 issues an AXI request on the address channel 31a that includes the address of the data to be retrieved from the slave device 20. The AXI request is processed in a processing block 43 of the memory cipher engine 40 to format the request to the block size of the cryptographic engine (e.g., the AES engine 41). The formatted AXI request (e.g., Address MOD(AES_size)) is propagated to the slave device 20 via the address channel 31b. The corresponding data retrieved from the slave device 20 via the data channel 32a is stored in a buffer (e.g., a register) 44 of the memory cipher engine 40. The buffer 44 may have a size equal to the AES_size. The AES engine 41 decrypts the data stored in the buffer 44, and the corresponding plaintext data is returned to the master device 10 via the data channel 32b.

The block ciphering operation mode exemplified in FIG. 2 is much less vulnerable to side-channel attacks (SCA) or brute force attacks on the data bus, but it is slower than the stream cipher mode since the operation of the AES engine on the buffered data introduces additional latency.

Figure 3:
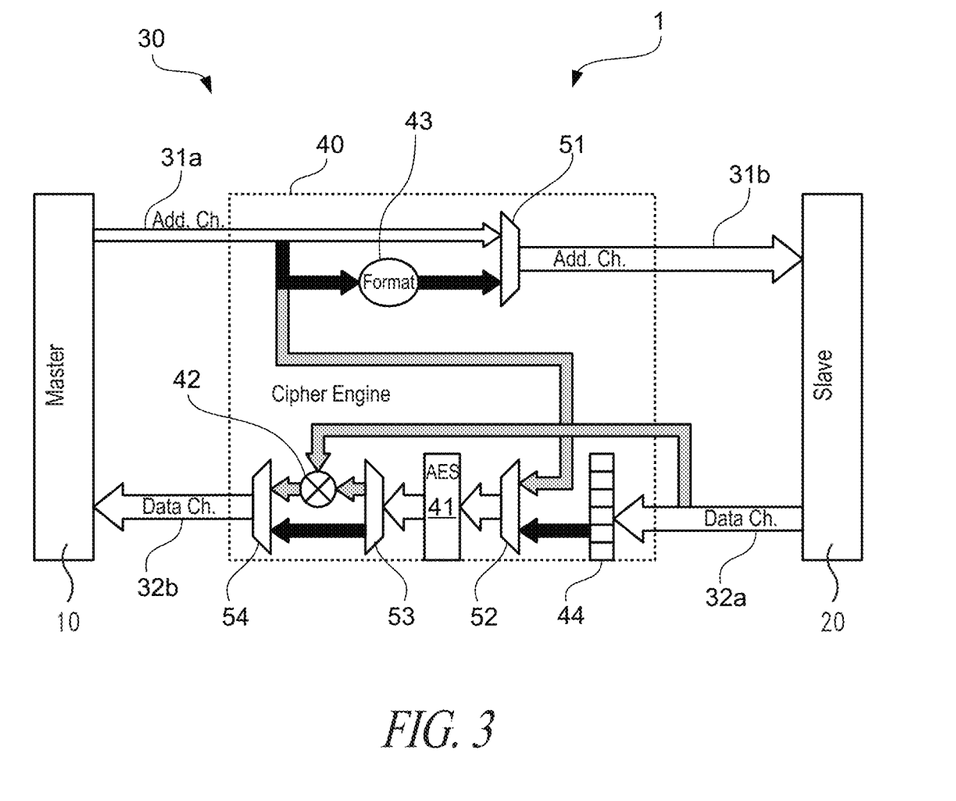
FIG. 3 is a circuit block diagram exemplary of a processing system including an on-the-fly memory cipher engine switchable between a stream cipher operation mode and a block cipher operation mode, according to one or more embodiments of the present description.

In one or more embodiments as exemplified in FIG. 3, the memory cipher engine 40 may switch between a first operation mode (e.g., stream ciphering) and a second operation mode (e.g., block ciphering) dynamically, e.g., as a function of the data address of the AXI request. For instance, this approach may be advantageous when the slave device 20 (e.g., an interface towards an external memory) stores both generic data with a low security level (that can be retrieved with low latency from the cryptographic engine) and secure data with higher computation latency (that can be retrieved with higher latency from the cryptographic engine). Since the cryptographic engine involves a high gate count (e.g., around sixteen thousand logic gates), using the same engine for both operation modes is particularly advantageous in terms of silicon area.

Therefore, as exemplified in FIG. 3, a memory cipher engine 40 may switch between the first operation mode and the second operation mode by setting one or more multiplexers to implement a stream cipher topology or a block cipher topology. By way of example, in FIG. 3 the grey arrows are indicative of a stream cipher topology, and the black arrows are indicative of a block cipher topology.

In particular, the memory cipher engine 40 may comprise a first multiplexer 51, which propagates either the AXI request as issued by the master device 10 (stream cipher topology) or the AXI request as formatted by the processing block 43 (block cipher topology) to the slave device 20 via the address channel 31*b*. The memory cipher engine 40 may further comprise a second multiplexer 52, which propagates either the AXI request as issued by the master device 10 (stream cipher topology) or the data retrieved from the slave device 20 and stored in the buffer 44 (block cipher topology) to the AES engine 41. The data output by the AES engine 41 may be stored in a first register (that is filled with keystreams produced by the AES engine 41, not visible in FIG. 3) or a second register (that is filled with plaintext data produced by the AES engine 41, not visible in FIG. 3) depending on the currently selected operation mode of the memory cipher engine 40. Therefore, the memory cipher engine 40 may further comprise a demultiplexer 53, which propagates the output data from the AES engine 41 either towards the first register (stream cipher topology) or towards the second register (block cipher topology). The first register may feed the XOR processing block 42. The memory cipher engine 40 may further comprise a third multiplexer 54, which propagates either the data output from the XOR processing block 42 (stream cipher topology) or the data decrypted by the AES engine 41 and stored in the second register (block cipher topology) to the master device 10 via the data channel 32*b*.

It is noted that dynamically switching between the first operation mode and the second operation mode may generate inconsistencies and/or protocol violations on the bus 30, in particular when switching from the block cipher mode to the stream cipher mode. Such inconsistencies may be due to two factors:

the memory cipher engine 40 may need additional computation time to provide the plaintext to the master device 10 before accepting data in stream cipher mode from the slave device 20, insofar as data retrieved from the slave device 20 in stream cipher mode is a stream and cannot be buffered; and/or when operating in the block cipher mode, the amount of data transferred from the slave device 20 to the master device 10 is also different, insofar as the AES engine 41 receives blocks of data (e.g., bytes) even if the master device requires only one block of data.

Certain solutions to the above-discussed issues may be considered. A first solution may be limiting the application to use a static selection between the stream cipher mode and the block cipher mode, but this is not a solution for dynamic traffic management. Another solution may rely on using two separate buses, but this would require an additional interconnect and an AES dedicated manager to distribute the cryptographic engine. Another solution may rely on the duplication of the cryptographic engine, with duplication of the silicon area. Another solution may rely on using the internal buffer 44 also during operation in the stream cipher mode. Another solution may rely on stalling the master device 10, when switching from the block cipher mode to the stream cipher mode, in order to "clean" the read channel of residual block cipher data traffic. This last solution would impact on the performance, insofar as the slave device gates the access to the external memory.

In order to improve the management of mixed data traffic on the bus 30 when switching the data bus from reading the buffer 44 to reading directly from the slave data channel 32*a* (e.g., when switching operation of the memory cipher engine 40 from a block cipher mode to a stream cipher mode), one or more embodiments may rely on stalling the data channel 32*a* of the slave device 20 until the master device 10 has completed a reading from the buffer 44.

Figure 4:
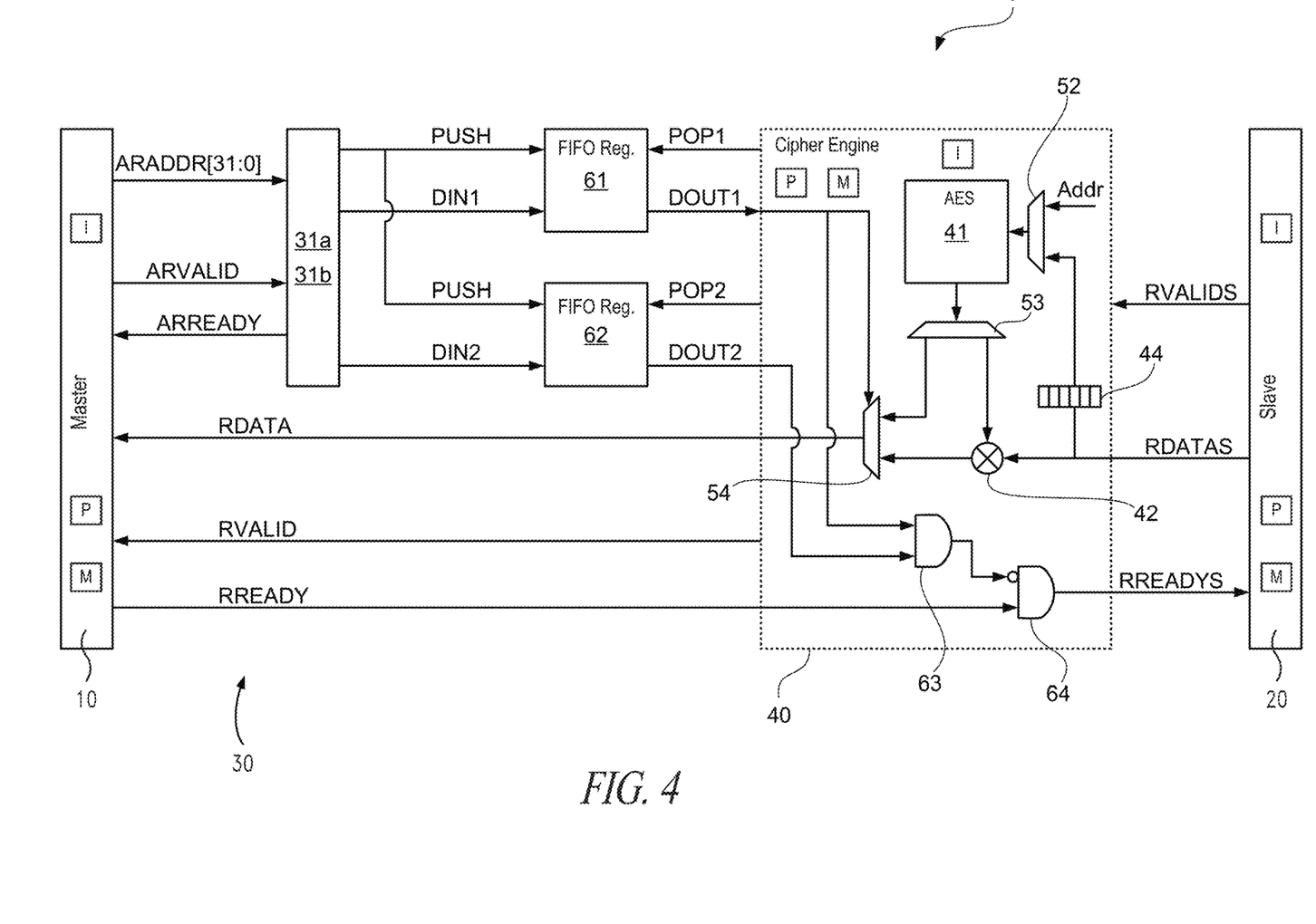
FIG. 4 is a circuit block diagram exemplary of implementation details of an on-the-fly memory cipher engine for use in a processing system according to one or more embodiments of the present description.

One or more embodiments may thus relate to a processing system 1 as exemplified in FIG. 4, which is a block diagram exemplary of certain components of the processing system, in particular certain components of a memory cipher engine configured to manage mixed data traffic on the bus 30 when the memory cipher engine switches between a block cipher operation mode and a stream cipher operation mode.

It is noted that in FIG. 4 certain signals of the bus 30 are designated according to the AXI protocol as defined in the reference document by ARM® cited at the beginning of the present description.

Signal ARADDR[31:0] of the read address channel has the master device 10 as source and stands for "read address"; the read address gives the address of the first transfer in a read burst transaction. Signal ARVALID of the read address channel has the master device 10 as source and stands for "read address valid"; this signal indicates that the channel is signaling valid read address and control information. Signal ARREADY of the read address channel has the slave device 20 as source and stands for "read address ready"; this signal indicates that the slave is ready to accept an address and associated control signals.

Signal RVALIDS of the read data channel has the slave device 20 as source and stands for "read valid"; this signal, as issued by the slave device, indicates that the channel is signaling the required read data. Signal RVALID is the same as signal RVALIDS, as received by the master device 10. Signal RDATAS of the read data channel has the slave device 20 as source and stands for "read data"; this signal, as issued by the slave device, carries the data retrieved from the slave device 20. Signal RDATA is the same as signal RVALIDS, as received by the master device 10 (e.g., as provided at the output of the multiplexer circuit 54). Signal RREADY of the read data channel has the master device 10 as source and stands for "read ready"; this signal, as issued by the master device, indicates that the master can accept the read data and response. Signal RREADYS is the same as signal RREADY, as received by the slave device 20 and possibly stalled by the memory cipher engine 40 as discussed in the following.

In one or more embodiments, in order to inform (e.g., make aware) the read channel of the bus 30 about the type of management expected (e.g., depending on whether the MCE 40 is expected to operate in a stream cipher mode or in a block cipher mode), information about the expected ciphering mode (e.g., streaming (CTR) or block (ECB) ciphering) may be stored in a register 61, particularly a FIFO register 61, also referred to as "FIFO of outstandings" (outstanding bursts). As exemplified in FIG. 4, information may be pushed (e.g., enqueued) in the FIFO register 61 as a function of a signal PUSH which corresponds to the request being granted (e.g., PUSH=ARVALID AND ARREADY). Thus, information coming from signal DIN1=ECB, which is indicative of the block ciphering mode expected for the next burst, may be pushed in the FIFO register 61 upon the request granting on the address channel. Information stored in the FIFO register 61 may be popped (e.g., dequeued) from the FIFO register 61 via signal DOUT1=ECB as a function of a signal POP1 which indicates that the last data beat was transferred to master (e.g., POP1=RLAST and RVALID and RREADY). Signal DOUT1 may be used to control the multiplexer circuit 54 so that, depending on the value of signal DOUT1, the data transferred to the master device 10 via the signal RDATA is either the data coming from the XOR gate 42 (if the memory cipher engine operates in stream cipher mode) or the data coming from the AES engine 41 (if the memory cipher engine operates in block cipher mode).

However, storing information about the expected ciphering mode in the FIFO register 61 may not be sufficient in the case a block cipher (e.g., ECB) burst is followed by a stream cipher (e.g., CTR) burst.

Therefore, one or more embodiments as exemplified in FIG. 4 may rely on stalling the streaming (e.g., CTR) data coming from the slave device 20 dynamically until the block burst has been completed (e.g., completely received) by the master device 10. For this purpose, in one or more embodiments the memory cipher engine may comprise a second register 62, also referred to as "ECB2STR" register, particularly a FIFO register 62. Information containing the stream cipher tag (e.g., CTR tag) of the next burst may be stored in the register 62. As exemplified in FIG. 4, information may be pushed (e.g., enqueued) in the FIFO register 62 as a function of the same signal PUSH that controls the first FIFO register 61. Thus, information coming from signal DIN2=CTR, which is indicative of the stream ciphering mode expected for the next burst, may be pushed in the FIFO register 62 upon the request granting on the address channel. Information stored in the FIFO register 62 may be popped (e.g., dequeued) from the FIFO register 62 via signal DOUT2=CTR as a function of a signal POP2 that is generated upon the slave end of burst, the end of burst from the slave side (e.g., POP2=RLASTS and RVALIDS and RREADYS). The memory cipher engine 40 may comprise an AND gate 63 that receives signals DOUT1 and DOUT2 as input signals and produces a respective output signal. The memory cipher engine 40 may comprise an AND gate 64 that receives as a first input an inverted replica of the signal produced by the AND gate 63, and as a second input the RREADY signal from the master device 10, to produce the RREADYS signal for the slave device 20.

As shown in FIG. 4, the master devices 10, slave devices 20 and cipher engines 40 of FIGS. 1-4 may comprise one or more processors P, one or more memories M, and one or more interfaces I. The one or more processors P and the one or more memories M, in operation, may implement one or more functions associated with the respective device. For example, a processor P may execute instructions stored in one or more memories M. The interfaces I may, for example, couple a respective device to the interconnect bus 30.

Figure 5:
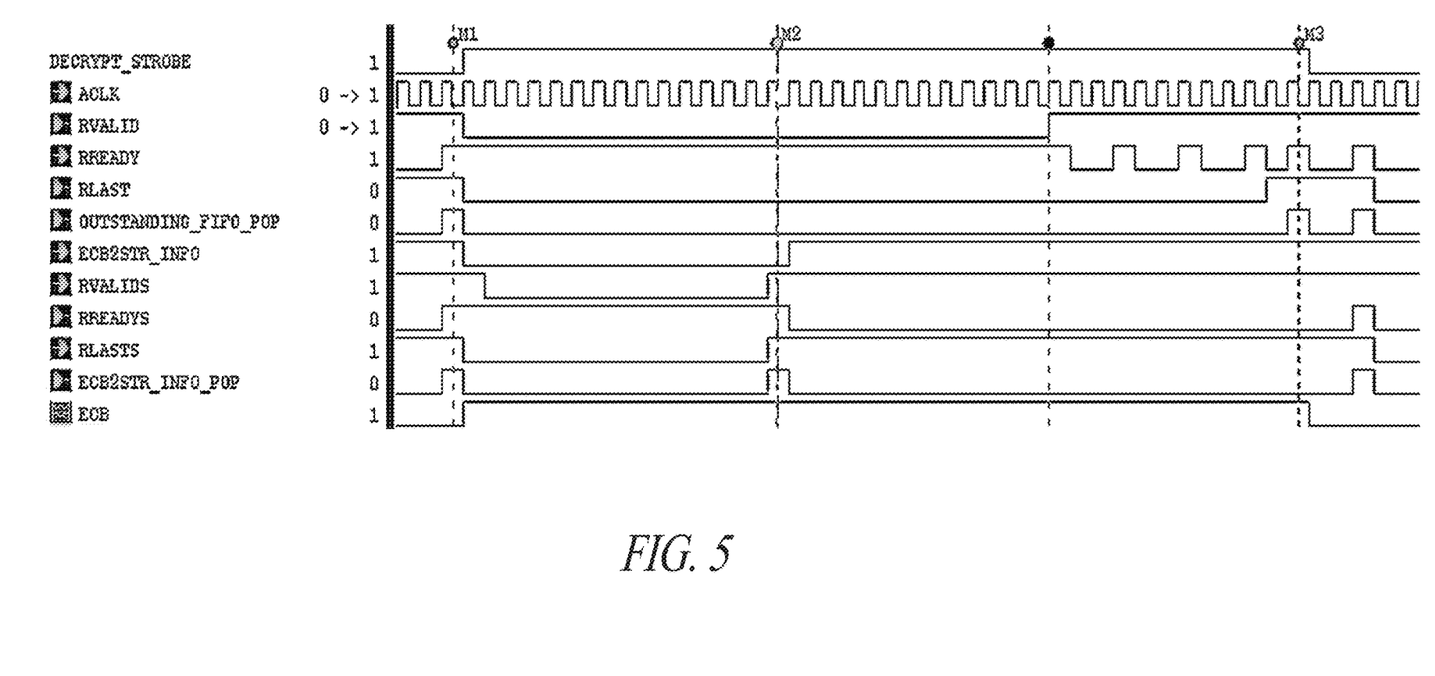
FIG. 5 is a diagram exemplary of the time evolution of signals in a processing system according to one or more embodiments of the present description.

FIG. 5 is a time diagram exemplary of possible behavior of signals ACLK (e.g., a global clock signal of the interconnect bus 30), RVALID, RREADY, RLAST, POP1 (indicated as "OUTSTANDING FIFO POP" in FIG. 5), DOUT2 (indicated as "ECB2STR_INFO" in FIG. 5), RVALIDS, RREADYS, RLASTS, POP2 (indicated as "ECB2STR_INFO_POP" in FIG. 5) and ECB in one or more embodiments.

In FIG. 5, a new block cipher burst (e.g., ECB burst) starts at instant M1. At instant M2, the block cipher burst has run out for the slave device but not for the master device, and information DOUT2 is popped (e.g., dequeued) from the FIFO register 62 to check the kind of encryption of the next burst. Since the kind of encryption of the next burst is a streaming encryption (e.g., CTR), the slave device 20 is stalled (RREADYS=0) until the master device 10 finishes processing the current block cipher burst. At instant M3, the master device 10 has received the last data of the block cipher burst; from this instant, signal RREADYS is no longer stalled (RREADYS=RREADY) and a stream cipher burst can be processed, driven by the slave device 10.

It is noted that one or more embodiments may be applied in any case where the read channel has to switch from reading buffered information to reading a stream of data, so they may also be applied when switching to plaintext traffic (e.g., in case the slave device 20 stores information that is not encrypted, e.g., the slave device stores directly the plaintext).

It is also noted that one or more embodiments may operate provided that the slave device 10 disables the "out of order" feature, a feature of the AXI bus that allows a master device to issue transactions without waiting for earlier transactions to complete, relying on the use of AXI ID transaction identifiers.

Therefore, one or more embodiments may relate to an on-the-fly decryption engine comprising a "dual" outstanding FIFO register (61, 62) that is also updated upon the burst generated by the slave device to know the kind of encryption of the next burst before the master completes the current burst. One or more embodiments may rely on gating the AXI read channel for a time sufficient to let the master device 10 complete the buffered data transfers. In one or more embodiments, the AES engine 41 can be used to alternatively generate keystream or block ciphering; the output from the memory cipher engine may be delivered to the master device 10, dynamically driven from the internal buffer or the slave device 20, depending on the ciphering mode.

One or more embodiments may thus provide one or more of the following advantages:
  reuse of a single IP and crypto engine (e.g., AES engine 41 in the memory cipher engine 40) to generate mixed streaming- and block-oriented traffic;
  area and cost saving;
  ease of configuration; and
  improved performance, insofar as the implementation only impacts the read channel of the bus 30.

Without prejudice to the underlying principles, the details and embodiments may vary, even significantly, with respect to what has been described by way of example only, without departing from the extent of protection.

In one or more embodiments, a processing system comprises a master device and a slave device coupled via an interconnection bus. The master device is configured to issue memory burst transaction requests via the interconnection bus to fetch data from the slave device. The processing system comprises a cipher engine coupled to the interconnection bus and configured to decrypt the data fetched from the slave device to produce plaintext data for the master device. The cipher engine selectively operates according to a stream cipher operation mode, wherein a stream of data is fetched from the slave device and processed in a combinatorial circuit to produce the plaintext data, or according to a block cipher operation mode, wherein a block of data is fetched from the slave device, stored in a buffer memory of the cipher engine, and processed in a cryptographic engine to produce the plaintext data. The cipher engine is configured to stall a read data channel of the interconnection bus between the slave device and the master device in response to the cipher engine switching from the block cipher operation mode to the stream cipher operation mode. The cipher engine is configured to reactivate the read data channel in response to a last beat of a read burst of the plaintext data produced by the cryptographic engine and corresponding to the block of data stored in the buffer memory being received by the master device.

In one or more embodiments, the cipher engine may comprise a first register configured to store, for each of the memory transaction requests, information as to whether the memory transaction request is to be processed in the block cipher operation mode. The cipher engine may switch between the stream cipher operation mode and the block cipher operation mode as a function of data fetched from the first register in response to the master device having received all data of a previous memory transaction request.

In one or more embodiments, the cipher engine may comprise a second register configured to store, for each of the memory transaction requests, information as to whether the memory transaction request is to be processed in the stream cipher operation mode. The cipher engine may stall the read data channel as a function of data fetched from the second register in response to the slave device having returned all data of a previous memory transaction request.

In one or more embodiments, the slave device may include a memory and/or an interface to a memory external to the processing system.

In one or more embodiments, the stream cipher operation mode may include a counter operation mode and/or the block cipher operation mode may include an electronic codebook operation mode.

In one or more embodiments, the cipher engine may switch between the stream cipher operation mode and the block cipher operation mode as a function of a data address included in the memory transaction requests.

In one or more embodiments, the interconnection bus may operate according to an Advanced eXtensible Interface (AXI) protocol.

In one or more embodiments, a method of operating a processing system according to one or more embodiments may comprise issuing, at the master device, memory burst transaction requests via the interconnection bus to fetch data from the slave device. The method may comprise decrypting the data fetched from the slave device to produce plaintext data for the master device. Decrypting data may include selectively operating the cipher engine according to a stream cipher operation mode, wherein a stream of data is fetched from the slave device and processed in a combinatorial circuit to produce the plaintext data, or according to a block cipher operation mode, wherein a block of data is fetched from the slave device, stored in a buffer memory of the cipher engine, and processed in a cryptographic engine to produce the plaintext data. The method may comprise stalling a read data channel of the interconnection bus between the slave device and the master device in response to the cipher engine switching from the block cipher operation mode to the stream cipher operation mode. The method may comprise reactivating the read data channel in response to a last beat of a read burst of the plaintext data produced by the cryptographic engine and corresponding to the block of data stored in the buffer memory being received by the master device.

In an embodiment, a processing system comprises: a master device, which, in operation, issues memory burst transaction requests; a slave device, which, in operation, produces data in response to memory burst transaction requests; a cipher engine, which, in operation, outputs plaintext data; and an interconnection bus coupled to the master device, the slave device and the cipher engine, wherein the cipher engine selectively operates in one of a plurality of operation modes, the plurality of operation modes including: a stream cipher operation mode, wherein a stream of data produced by the slave device is processed in a combination circuit of the cipher engine to produce plaintext data provided to the master device by the cipher engine via the interconnection bus; and a block cipher operation mode, wherein a block of data produced by the slave device is stored in a buffer memory of the cipher engine, and processed in a cryptographic engine of the cipher engine to produce plaintext data provided to the master device by the cipher engine via the interconnection bus, wherein, in response to an indication of a change from the block cipher mode of operation to the stream cipher mode of operation, the cipher engine: stalls a read data channel of the interconnection bus between the slave device and the master device; and responds to an indication the master device has received a last beat of a read burst of plaintext data associated with a block of data stored in the buffer memory by reactivating the read data channel.

In an embodiment, said cipher engine comprises a first register, which, in operation, stores, for each of said memory burst transaction requests, information as to whether the memory burst transaction request is to be processed in said block cipher operation mode, and wherein the cipher engine switches between said stream cipher operation mode and said block cipher operation mode as a function of data fetched from said first register in response to an indication the master device has received all data associated with a previous memory burst transaction request. In an embodiment, said cipher engine comprises a second register, which, in operation, stores, for each of said memory burst transaction requests, information as to whether the memory transaction request is to be processed in said stream cipher operation mode, and wherein the cipher engine stalls said read data channel as a function of data fetched from said second register in response to the slave device having returned all data of a previous memory burst transaction request.

In an embodiment, the slave device includes a memory or includes an interface to a memory external to the processing system. In an embodiment, the stream cipher operation mode includes a counter operation mode. In an embodiment, the block cipher operation mode includes an electronic codebook operation mode.

In an embodiment, the cipher engine, in operation, switches between operation modes of the plurality of operation modes as a function of a data address included in said memory burst transaction requests. In an embodiment, the interconnection bus operates according to an Advanced eXtensible Interface, AXI, protocol.

In an embodiment, the plurality of operation modes of the cipher engine include a bypass mode of operation, in which a stream of plaintext data produced by the slave device is provided to the master device via the interconnection bus. In an embodiment, in response to an indication of a change from the block cipher mode of operation to the bypass mode of operation, the cipher engine: stalls the read data channel of the interconnection bus between the slave device and the master device; and responds to an indication the master device has received a last beat of a read burst of plaintext data associated with a block of data stored in the buffer memory by reactivating the read data channel.

In an embodiment, a method comprises: issuing, by a master device, memory burst transaction requests; producing, by a slave device, data in response to memory burst transaction requests; processing, by a cipher engine, data, outputting plaintext data; and coupling together, using an interconnection bus, the master device, the slave device and the cipher engine, wherein the cipher engine selectively operates according one of a plurality of operation modes, the plurality of operation modes including: a stream cipher operation mode, wherein decrypting the data comprises decrypting a stream of data produced by the slave device using a combination circuit of the cipher engine to produce plaintext data provided to the master device by the cipher engine via the interconnection bus; and a block cipher operation mode, wherein decrypting the data comprises storing a block of data produced by the slave device in a buffer memory of the cipher engine, and processing the data stored in the buffer memory in a cryptographic engine to produce plaintext data provided to the master device by the cipher engine via the interconnection bus, wherein, the method includes: stalling a read data channel of the interconnection bus between the slave device and the master device in response to an indication of a change from the stream cipher operation mode to a block cipher operation mode; and reactivating the read data channel in response to an indication the master device has received a last beat of a read burst of plaintext data associated with a block of data stored in the buffer memory. In an embodiment, the method comprises: storing, for each memory burst transaction request, information in a first register indicating whether the memory burst transaction request is to be processed in said block cipher operation mode; and switching between said stream cipher operation mode and said block cipher operation mode as a function of data fetched from said first register in response to an indication the master device has received all data associated with a previous memory burst transaction request. In an embodiment, the method comprises: storing, for each memory burst transaction requests, information in a second register indicating whether the memory transaction request is to be processed in said stream cipher operation mode; stalling said read data channel as a function of data fetched from said second register in response to the slave device having returned all data of a previous memory burst transaction request. In an embodiment, the stream cipher operation mode includes a counter operation mode; the block cipher operation mode includes an electronic codebook operation mode; or the stream cipher operation mode includes a counter operation mode and the block cipher operation mode includes an electronic codebook operation mode. In an embodiment, the method comprises: switching the cipher engine between operation modes of the plurality of operation modes as a function of a data address included in said memory burst transaction requests. In an embodiment, the plurality of operation modes of the cipher engine include a bypass mode of operation, in which a stream of plaintext data produced by the slave device is provided to the master device via the interconnection bus. In an embodiment, the method comprises: stalling the read data channel of the interconnection bus in response to an indication of a change from the block cipher mode of operation to the bypass mode of operation; and reactivating the read data channel in response to an indication the master device has received a last beat of a read burst of plaintext data associated with a block of data stored in the buffer memory.

In an embodiment, a device comprises: an interface; and a cipher engine coupled to the interface, wherein the cipher engine, in operation, outputs plaintext data responsive to memory burst transaction requests via the interface, wherein the cipher engine selectively operates according one of a plurality of operation modes, the plurality of operation modes including: a stream cipher operation mode, wherein the cipher engine, in operation, applies combinational logic to a stream of data to produce plaintext data; and a block cipher operation mode, wherein the cipher engine, in operation, applies block processing operations to a stored block of data to produce plaintext data, wherein, in response to an indication of a change from the block cipher mode of operation to the stream cipher mode of operation, the cipher engine: stalls a read data channel of the interface; and responds to an indication of receipt of a last beat of a read burst of plaintext data associated with a block of data processed in the block cipher mode of operation by reactivating the read data channel. In an embodiment, the cipher engine comprises a first register, which, in operation, stores, for each of said memory burst transaction requests, information as to whether the memory burst transaction request is to be processed in said block cipher operation mode, and wherein the cipher engine switches between said stream cipher operation mode and said block cipher operation mode as a function of data fetched from said first register in response to an indication all data associated with a previous memory burst transaction request has been received. In an embodiment, the cipher engine comprises a second register, which, in operation, stores, for each of said memory burst transaction requests, information as to whether the memory transaction request is to be processed in said stream cipher operation mode. In an embodiment, the interface, in operation, couples the cipher engine to an interconnection bus. In an embodiment, the interface is an interconnection bus, which, in operation, couples the cipher engine to a master device and to a slave device. In an embodiment, the plurality of operation modes of the cipher engine include a bypass mode of operation, in which a stream of plaintext data produced by the slave device is provided to the master device by the cipher engine via the interconnection bus.

In an embodiment, a non-transitory computer-readable medium's contents cause a cipher device to perform a method, the method comprising: selectively operating a cipher engine in one of a plurality of operational modes, the plurality of operational modes including: a stream cipher mode of operation, wherein the cipher engine applies combinational logic to a stream of data to produce plaintext data; and a block cipher mode of operation, wherein the cipher engine applies block processing operations to a stored block of data to produce plaintext data; and responding to an indication of a change from the block cipher mode of operation to the stream cipher mode of operation by: stalling a read data channel; and responding to an indication of receipt of a last beat of a read burst of plaintext data associated with a block of data processed in the block cipher mode of operation by reactivating the read data channel. In an embodiment, the plurality of operational modes of the cipher engine include a bypass mode of operation, in which a stream of plaintext data is passed through the cipher engine without applying cipher processing to the stream of data. In an embodiment, the contents comprises instructions executed by the cipher engine.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A processing system, comprising:
   a master device including processing circuitry, which, in operation, issues memory burst transaction requests;
   a slave device including processing circuitry, which, in operation, produces data in response to memory burst transaction requests;
   a cipher engine including processing circuitry, which, in operation, outputs plaintext data; and
   an interconnection bus coupled to the master device, the slave device and the cipher engine, wherein the cipher engine selectively operates in one of a plurality of operation modes, the plurality of operation modes including:
      a stream cipher operation mode, wherein a stream of data produced by the slave device is processed in a combination circuit of the cipher engine to produce plaintext data provided to the master device by the cipher engine via the interconnection bus; and
      a block cipher operation mode, wherein a block of data produced by the slave device is stored in a buffer memory of the cipher engine, and processed in a cryptographic engine of the cipher engine to produce plaintext data provided to the master device by the cipher engine via the interconnection bus, wherein, in response to an indication of a change from the block cipher mode of operation to the stream cipher mode of operation, the cipher engine:
         stalls a read data channel of the interconnection bus between the slave device and the master device; and
         responds to an indication the master device has received a last beat of a read burst of plaintext data associated with a block of data stored in the buffer memory by reactivating the read data channel, wherein,
   the cipher engine comprises a first register, which, in operation, stores, for each of the memory burst transaction requests, information as to whether the memory burst transaction request is to be processed in the block cipher operation mode, and the cipher engine switches between the stream cipher operation mode and the block cipher operation mode as a function of data fetched from the first register in response to an indication the master device has received all data associated with a previous memory burst transaction request, and
   the cipher engine comprises a second register, which, in operation, stores, for each of the memory burst transaction requests, information as to whether the memory transaction request is to be processed in the stream cipher operation mode, and the cipher engine stalls the read data channel as a function of data fetched from the second register in response to the slave device having returned all data of a previous memory burst transaction request.

2. The processing system of claim 1, wherein the slave device includes a memory or includes an interface to a memory external to the processing system.

3. The processing system of claim 1, wherein the stream cipher operation mode includes a counter operation mode.

4. The processing system of claim 1, wherein the block cipher operation mode includes an electronic codebook operation mode.

5. The processing system of claim 1, wherein the cipher engine, in operation, switches between operation modes of the plurality of operation modes as a function of a data address included in the memory burst transaction requests.

6. The processing system of claim 1, wherein the interconnection bus operates according to an Advanced extensible Interface, AXI, protocol.

7. The processing system of claim 1, wherein the plurality of operation modes of the cipher engine include a bypass mode of operation, in which a stream of plaintext data produced by the slave device is provided to the master device via the interconnection bus.

8. A processing system, comprising:
   a master device including processing circuitry, which, in operation, issues memory burst transaction requests;
   a slave device including processing circuitry, which, in operation, produces data in response to memory burst transaction requests;
   a cipher engine including processing circuitry, which, in operation, outputs plaintext data; and
   an interconnection bus coupled to the master device, the slave device and the cipher engine, wherein the cipher engine selectively operates in one of a plurality of operation modes, the plurality of operation modes including:
      a stream cipher operation mode, wherein a stream of data produced by the slave device is processed in a combination circuit of the cipher engine to produce plaintext data provided to the master device by the cipher engine via the interconnection bus; and
      a block cipher operation mode, wherein a block of data produced by the slave device is stored in a buffer memory of the cipher engine, and processed in a cryptographic engine of the cipher engine to produce plaintext data provided to the master device by the cipher engine via the interconnection bus, wherein, in response to an indication of a change from the block cipher mode of operation to the stream cipher mode of operation, the cipher engine:
stalls a read data channel of the interconnection bus between the slave device and the master device; and
responds to an indication the master device has received a last beat of a read burst of plaintext data associated with a block of data stored in the buffer memory by reactivating the read data channel, wherein,
the plurality of operation modes of the cipher engine include a bypass mode of operation, in which a stream of plaintext data produced by the slave device is provided to the master device via the interconnection bus, and
in response to an indication of a change from the block cipher mode of operation to the bypass mode of operation, the cipher engine:
stalls the read data channel of the interconnection bus between the slave device and the master device; and
responds to an indication the master device has received a last beat of a read burst of plaintext data associated with a block of data stored in the buffer memory by reactivating the read data channel.

9. The processing system of claim 8, wherein the cipher engine comprises a first register, which, in operation, stores, for each of the memory burst transaction requests, information as to whether the memory burst transaction request is to be processed in the block cipher operation mode, and wherein the cipher engine switches between the stream cipher operation mode and the block cipher operation mode as a function of data fetched from the first register in response to an indication the master device has received all data associated with a previous memory burst transaction request.

10. The processing system of claim 9, wherein the cipher engine comprises a second register, which, in operation, stores, for each of the memory burst transaction requests, information as to whether the memory transaction request is to be processed in the stream cipher operation mode, and wherein the cipher engine stalls the read data channel as a function of data fetched from the second register in response to the slave device having returned all data of a previous memory burst transaction request.

11. A method, comprising:
issuing, by a master device, memory burst transaction requests;
producing, by a slave device, data in response to memory burst transaction requests;
processing, by a cipher engine including processing circuitry, data, outputting plaintext data; and
coupling together, using an interconnection bus, the master device, the slave device and the cipher engine, wherein the cipher engine selectively operates according one of a plurality of operation modes, the plurality of operation modes including:
a stream cipher operation mode, wherein decrypting the data comprises decrypting a stream of data produced by the slave device using a combination circuit of the cipher engine to produce plaintext data provided to the master device by the cipher engine via the interconnection bus; and
a block cipher operation mode, wherein decrypting the data comprises storing a block of data produced by the slave device in a buffer memory of the cipher engine, and processing the data stored in the buffer memory in a cryptographic engine to produce plaintext data provided to the master device by the cipher engine via the interconnection bus,
wherein, the method includes:
stalling a read data channel of the interconnection bus between the slave device and the master device in response to an indication of a change from the stream cipher operation mode to a block cipher operation mode; and
reactivating the read data channel in response to an indication the master device has received a last beat of a read burst of plaintext data associated with a block of data stored in the buffer memory, wherein the method comprises:
storing, for each memory burst transaction request, information in a first register indicating whether the memory burst transaction request is to be processed in the block cipher operation mode;
switching between the stream cipher operation mode and the block cipher operation mode as a function of data fetched from the first register in response to an indication the master device has received all data associated with a previous memory burst transaction request;
storing, for each memory burst transaction requests, information in a second register indicating whether the memory transaction request is to be processed in the stream cipher operation mode; and
stalling the read data channel as a function of data fetched from the second register in response to the slave device having returned all data of a previous memory burst transaction request.

12. The method of claim 11, wherein,
the stream cipher operation mode includes a counter operation mode;
the block cipher operation mode includes an electronic codebook operation mode; or
the stream cipher operation mode includes a counter operation mode and the block cipher operation mode includes an electronic codebook operation mode.

13. The method of claim 11, comprising:
switching the cipher engine between operation modes of the plurality of operation modes as a function of a data address included in the memory burst transaction requests.

14. The method of claim 11, wherein the plurality of operation modes of the cipher engine include a bypass mode of operation, in which a stream of plaintext data produced by the slave device is provided to the master device via the interconnection bus.

15. A method, comprising:
issuing, by a master device, memory burst transaction requests;
producing, by a slave device, data in response to memory burst transaction requests;
processing, by a cipher engine including processing circuitry, data, outputting plaintext data; and
coupling together, using an interconnection bus, the master device, the slave device and the cipher engine, wherein the cipher engine selectively operates according one of a plurality of operation modes, the plurality of operation modes including:
a stream cipher operation mode, wherein decrypting the data comprises decrypting a stream of data produced by the slave device using a combination circuit of the cipher engine to produce plaintext data provided to the master device by the cipher engine via the interconnection bus;
a block cipher operation mode, wherein decrypting the data comprises storing a block of data produced by the slave device in a buffer memory of the cipher engine, and processing the data stored in the buffer memory in a cryptographic engine to produce plaintext data provided to the master device by the cipher engine via the interconnection bus; and
a bypass mode of operation, in which a stream of plaintext data produced by the slave device is provided to the master device via the interconnection bus,
wherein, the method includes:
stalling a read data channel of the interconnection bus between the slave device and the master device in response to an indication of a change from the stream cipher operation mode to a block cipher operation mode;
stalling the read data channel of the interconnection bus in response to an indication of a change from the block cipher mode of operation to the bypass mode of operation; and
reactivating the read data channel in response to an indication the master device has received a last beat of a read burst of plaintext data associated with a block of data stored in the buffer memory.

16. The method of claim 15, comprising:
storing, for each memory burst transaction request, information in a first register indicating whether the memory burst transaction request is to be processed in the block cipher operation mode; and
switching between the stream cipher operation mode and the block cipher operation mode as a function of data fetched from the first register in response to an indication the master device has received all data associated with a previous memory burst transaction request.

17. The method of claim 16, comprising:
storing, for each memory burst transaction requests, information in a second register indicating whether the memory transaction request is to be processed in the stream cipher operation mode; and
stalling the read data channel as a function of data fetched from the second register in response to the slave device having returned all data of a previous memory burst transaction request.

18. A device, comprising:
an interface; and
a cipher engine coupled to the interface, wherein the cipher engine includes processing circuitry, and in operation, outputs plaintext data responsive to memory burst transaction requests received from a master device via the interface, wherein the cipher engine selectively operates according one of a plurality of operation modes, the plurality of operation modes including:
a stream cipher operation mode, wherein the cipher engine, in operation, applies combinational logic to a stream of data produced by a slave device to produce plaintext data; and
a block cipher operation mode, wherein the cipher engine, in operation, applies block processing operations to a stored block of data produced by the slave device to produce plaintext data, wherein, in response to an indication of a change from the block cipher mode of operation to the stream cipher mode of operation, the cipher engine:
stalls a read data channel of the interface; and
responds to an indication the master device has received a last beat of a read burst of plaintext data associated with a block of data processed in the block cipher mode of operation by reactivating the read data channel, wherein,
the cipher engine comprises a first register, which, in operation, stores, for each of the memory burst transaction requests, information as to whether the memory burst transaction request is to be processed in the block cipher operation mode, and the cipher engine switches between the stream cipher operation mode and the block cipher operation mode as a function of data fetched from the first register in response to an indication the master device has received all data associated with a previous memory burst transaction request, and
the cipher engine comprises a second register, which, in operation, stores, for each of the memory burst transaction requests, information as to whether the memory transaction request is to be processed in the stream cipher operation mode, and the cipher engine stalls the read data channel as a function of data fetched from the second register in response to the slave device having returned all data of a previous memory burst transaction request.

19. The device of claim 18, wherein the interface, in operation, couples the cipher engine to an interconnection bus.

20. The device of claim 18, wherein the interface is an interconnection bus, which, in operation, couples the cipher engine to the master device and to the slave device.

21. A device, comprising:
an interface; and
a cipher engine coupled to the interface, wherein the cipher engine includes processing circuitry, and in operation, outputs plaintext data responsive to memory burst transaction requests received from a master device via the interface, wherein the cipher engine selectively operates according one of a plurality of operation modes, the plurality of operation modes including:
a stream cipher operation mode, wherein the cipher engine, in operation, applies combinational logic to a stream of data produced by a slave device to produce plaintext data;
a block cipher operation mode, wherein the cipher engine, in operation, applies block processing operations to a stored block of data produced by the slave device to produce plaintext data, the stored block of data being stored in a buffer memory of the ciper engine; and
a bypass mode of operation, in which a stream of plaintext data produced by the slave device is provided to the master device by the cipher engine via the interface, wherein,
in response to an indication of a change from the block cipher mode of operation to the stream cipher mode of operation, the cipher engine:
stalls a read data channel of the interface; and
responds to an indication the master device has received a last beat of a read burst of plaintext data associated with a block of data processed in the block cipher mode of operation by reactivating the read data channel, and in response to an indication of a change from the block cipher mode of operation to the bypass mode of operation, the cipher engine:
  stalls the read data channel of the interface between the slave device and the master device; and
  responds to an indication the master device has received a last beat of a read burst of plaintext data associated with a block of data stored in the buffer memory by reactivating the read data channel.

22. The device of claim 21, wherein the cipher engine comprises a first register, which, in operation, stores, for each of the memory burst transaction requests, information as to whether the memory burst transaction request is to be processed in the block cipher operation mode, and wherein the cipher engine switches between the stream cipher operation mode and the block cipher operation mode as a function of data fetched from the first register in response to an indication all data associated with a previous memory burst transaction request has been received.

23. The device of claim 22, wherein the cipher engine comprises a second register, which, in operation, stores, for each of the memory burst transaction requests, information as to whether the memory transaction request is to be processed in the stream cipher operation mode.

24. A non-transitory computer-readable medium having contents which cause a cipher device to perform a method, the method comprising:
  selectively operating a cipher engine including processing circuitry in one of a plurality of operational modes in response to memory burst transaction requests received from a master device, the plurality of operational modes including:
    a stream cipher mode of operation, wherein the cipher engine applies combinational logic to a stream of data produced by a slave device to produce plaintext data; and
    a block cipher mode of operation, wherein the cipher engine applies block processing operations to a stored block of data produced by the slave device to produce plaintext data; and
  responding to an indication of a change from the block cipher mode of operation to the stream cipher mode of operation by:
    stalling a read data channel; and
    responding to an indication a master device has received a last beat of a read burst of plaintext data associated with a block of data processed in the block cipher mode of operation by reactivating the read data channel, wherein the method comprises:
  storing, for each memory burst transaction request, information in a first register indicating whether the memory burst transaction request is to be processed in the block cipher operation mode;
  switching between the stream cipher operation mode and the block cipher operation mode as a function of data fetched from the first register in response to an indication the master device has received all data associated with a previous memory burst transaction request;
  storing, for each memory burst transaction requests, information in a second register indicating whether the memory transaction request is to be processed in the stream cipher operation mode; and
  stalling the read data channel as a function of data fetched from the second register in response to the slave device having returned all data of a previous memory burst transaction request.

25. The non-transitory computer-readable medium of claim 24, wherein the plurality of operational modes of the cipher engine include a bypass mode of operation, in which a stream of plaintext data is passed through the cipher engine without applying cipher processing to the stream of data.

26. The non-transitory computer-readable medium of claim 24, wherein the contents comprises instructions executed by the cipher engine.

* * * * *

UNITED STATES PATENT AND TRADEMARK OFFICE
CERTIFICATE OF CORRECTION

PATENT NO. : 12,174,973 B2
APPLICATION NO. : 17/737570
DATED : December 24, 2024
INVENTOR(S) : Rosalino Critelli Page 1 of 1

It is certified that error appears in the above-identified patent and that said Letters Patent is hereby corrected as shown below:

In the Claims

Column 14, Claim 6, Lines 38-39:
"Advanced extensible Interface," should read: -- Advanced eXtensible Interface, --.

Signed and Sealed this
Eleventh Day of February, 2025

Coke Morgan Stewart
*Acting Director of the United States Patent and Trademark Office*